US010858059B2

(12) United States Patent
Hendey et al.

(10) Patent No.: US 10,858,059 B2
(45) Date of Patent: Dec. 8, 2020

(54) COMBINED TORQUE, DIRECTION, AND CADENCE SENSING SYSTEM FOR ELECTRIC BICYCLES

(71) Applicants: Matthew Hendey, Indianapolis, IN (US); Andrew Westrick, Carmel, IN (US)

(72) Inventors: Matthew Hendey, Indianapolis, IN (US); Andrew Westrick, Carmel, IN (US)

(*) Notice: Subject to any disclaimer, the term of this patent is extended or adjusted under 35 U.S.C. 154(b) by 0 days.

(21) Appl. No.: 16/449,429

(22) Filed: Jun. 23, 2019

(65) Prior Publication Data

US 2019/0308686 A1 Oct. 10, 2019

Related U.S. Application Data

(63) Continuation of application No. 15/936,053, filed on Mar. 26, 2018, now Pat. No. 10,689,056, which is a (Continued)

(51) Int. Cl.
*B62K 19/18* (2006.01)
*B62J 1/08* (2006.01)
(Continued)

(52) U.S. Cl.
CPC .............. *B62K 19/18* (2013.01); *B62J 1/08* (2013.01); *B62K 11/02* (2013.01); *B62K 19/32* (2013.01);
(Continued)

(58) Field of Classification Search
CPC ........ B62K 19/18; B62K 19/32; B62K 11/02; B62K 19/34; B62K 19/30; B62M 6/90;
(Continued)

(56) References Cited

U.S. PATENT DOCUMENTS

| 4,780,632 A * | 10/1988 | Murray, III ............ H02K 19/24 310/111 |
| 6,296,072 B1 * | 10/2001 | Turner .................. B62M 11/18 180/220 |

(Continued)

*Primary Examiner* — Anne Marie M Boehler
*Assistant Examiner* — Felicia L. Brittman
(74) *Attorney, Agent, or Firm* — Roberts IP Law; John Roberts

(57) ABSTRACT

A unitary system for an electric-assist bicycle generates signals indicative of power input to a drive system of the bicycle when a rider pedals the bicycle, considering torque applied by the rider, as well as the cadence or speed of the rider's pedaling. Direction of pedaling is also measured using the system. The system utilizes fixed, hard-wired, contactless electronics, namely first and second inductance coils that are non-equally-spaced circumferentially around a first axis, and which generate a first electrical signal indicative of torque based on lateral movement of a conductive or otherwise magnetically permeable rotatable member relative to the coils, and which generate second and third electrical signals indicative of pedaling cadence and direction based on eccentric relative rotational movement of the conductive or otherwise magnetically permeable rotatable member relative to the first and second inductance coils.

11 Claims, 17 Drawing Sheets

Related U.S. Application Data continuation-in-part of application No. 15/098,502, filed on Apr. 14, 2016, now Pat. No. 10,137,954.

(60) Provisional application No. 62/478,791, filed on Mar. 30, 2017, provisional application No. 62/147,356, filed on Apr. 14, 2015.

(51) Int. Cl.
| | | |
|---|---|---|
| *B62K 19/32* | (2006.01) | |
| *B62K 11/02* | (2006.01) | |
| *B62K 19/34* | (2006.01) | |
| *B62M 6/90* | (2010.01) | |
| *B62M 6/40* | (2010.01) | |
| *B62M 6/55* | (2010.01) | |
| *B60K 1/04* | (2019.01) | |

(52) U.S. Cl.
CPC ............... *B62K 19/34* (2013.01); *B60K 1/04* (2013.01); *B60Y 2200/13* (2013.01); *B62M 6/40* (2013.01); *B62M 6/55* (2013.01); *B62M 6/90* (2013.01)

(58) Field of Classification Search
CPC .. B62M 6/40; B62M 6/55; B60K 1/04; B60K 1/00; B60K 2001/0405; B62J 1/08; B60Y 2200/13; B60Y 2300/42
USPC ....................................... 180/206.4
See application file for complete search history.

(56) References Cited

U.S. PATENT DOCUMENTS 8,646,560 B2\* 2/2014 Chan ................ F16D 41/30
  180/206.3
9,227,695 B2\* 1/2016 Liu .................. B62K 19/34

\* cited by examiner

COMBINED TORQUE, DIRECTION, AND CADENCE SENSING SYSTEM FOR ELECTRIC BICYCLES

CROSS-REFERENCE TO RELATED APPLICATIONS

This application claims priority to and incorporates herein by reference, both U.S. patent application Ser. No. 15/936,053 to Hendey, filed Mar. 26, 2018 ("the '053 application"), and the provisional patent application to which the '053 application claims priority, namely U.S. Pat. App. Ser. No. 62/478,791 to Hendey et al., filed Mar. 30, 2017 ("the '791 application"). This application also claims priority to, is a continuation-in-part of, and incorporates herein by reference, both U.S. patent application Ser. No. 15/098,502 to Hendey et al., filed Apr. 14, 2016 and published on Oct. 20, 2016 as US 2016/0303961 A1 ("the '502 application"), and the provisional patent application to which the '502 application claims priority, U.S. Pat. App. Ser. No. 62/147,356 to Hendey et al., filed Apr. 14, 2015.

FEDERALLY SPONSORED RESEARCH OR DEVELOPMENT

None.

TECHNICAL FIELD

The present invention relates generally to bicycles that are powered sometimes at least in part by an electric motor and sometimes at least in part by a rider pedaling the bicycle, and sometimes by both, and more particularly to systems that measure the torque input to a drive system of an electric-assist bicycle when a rider pedals the bicycle, for purposes of controlling the output of the motor.

BACKGROUND

A need exists for simple, inexpensive, and robust way to measure not only the torque, but also the power input to a drive system of an electric-assist bicycle when a rider pedals the bicycle, for instance to control the power output of the electric-assist motor.

SUMMARY

The present invention(s) elegantly overcome many of the drawbacks of prior systems and provide numerous additional improvements and benefits as will be apparent to persons of skill in the art. Provided in various example embodiments is a unitary system for an electric-assist bicycle configured to generate signals indicative of power input to a drive system of the bicycle when a rider pedals the bicycle and rotates a crankshaft, comprising a first assembly rotatable about a first axis and configured to receive rotational power from the rider when the rider pedals the bicycle and to transmit that rotational power to propel the bicycle, which may comprise a rotatable member configured to move laterally relative to a plurality of proximately-located non-rotating inductance coils, at least two of which are non-equally-spaced circumferentially around the first axis, in proportion to an amount of torque applied by the rider to the first rotating assembly, wherein one or more of the inductance coils are configured to generate a first electrical signal indicative of said amount of torque based on lateral distance between the rotatable member and the first inductance coils.

A conductive or otherwise magnetically permeable member may be provided that is rotatable with the rotatable member and positioned proximate the plurality of non-rotating inductance coils, the conductive member defining a shape symmetrical about a second axis that is non-concentric with the first axis, wherein the conductive member is configured to move eccentrically relative to the inductance coils when the rotatable member rotates and to change the inductance of at least two of the inductance coils as the conductive member moves eccentrically relative to the inductance coils. The inductance coils may be further configured to generate a second electrical signal indicative of rotational speed of the crankshaft corresponding to a frequency with which the conductive member rotates eccentrically relative to at least two of the inductance coils. A circuit may be configured to combine the first and second electrical signals and generate a power input signal indicative of the power input to the drive system of the bicycle when the rider pedals the bicycle and rotates the crankshaft. In various example embodiments the inductance coils may be configured to generate a third electrical signal indicative of rotational direction of the crankshaft corresponding to an order in which the conductive member moves eccentrically relative to the inductance coils, and the circuit may be configured to combine the first, second, and third electrical signals and generate a directional power input signal indicative of the power input to the drive system of the bicycle when the rider pedals the bicycle and rotates the crankshaft in a first rotational direction. In various example embodiments the symmetrical shape defined by the conductive member about the second axis is circular. In various example embodiments the non-rotating inductance coils comprise two coils that are positioned at ninety degrees relative to one another circumferentially around the first axis.

Also provided in various example embodiments is an electric-assist bicycle comprising a unitary power measurement system configured to generate signals indicative of power input to a drive system of the bicycle when a rider pedals the bicycle and rotates a crankshaft, comprising: a unitary power measurement system as described herein; and a controller configured to process the power input signal and to generate a power output signal that is based at least partially on the power input signal and that is configured to control a level of power output by a motor configured to assist propulsion of the bicycle.

Further provided in various example embodiments is an electric-assist bicycle comprising a unitary power measurement system configured to generate signals indicative of power input to a drive system of the bicycle when a rider pedals the bicycle and rotates a crankshaft in a first rotational direction, comprising: a unitary power measurement system as described herein; and a controller configured to process the directional power input signal and to generate a power output signal that is based at least partially on the directional power input signal and that is configured to control a level of power output by a motor configured to assist propulsion of the bicycle.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure. It will be understood that certain components and details may not appear in the Figure(s) to assist in more clearly describing the invention.

DETAILED DESCRIPTION OF EXAMPLE EMBODIMENTS

Reference is made herein to some specific examples of the present invention, including any best modes contemplated by the inventor for carrying out the invention. Examples of these specific embodiments are illustrated in the accompanying Figure(s). While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Figure 1:
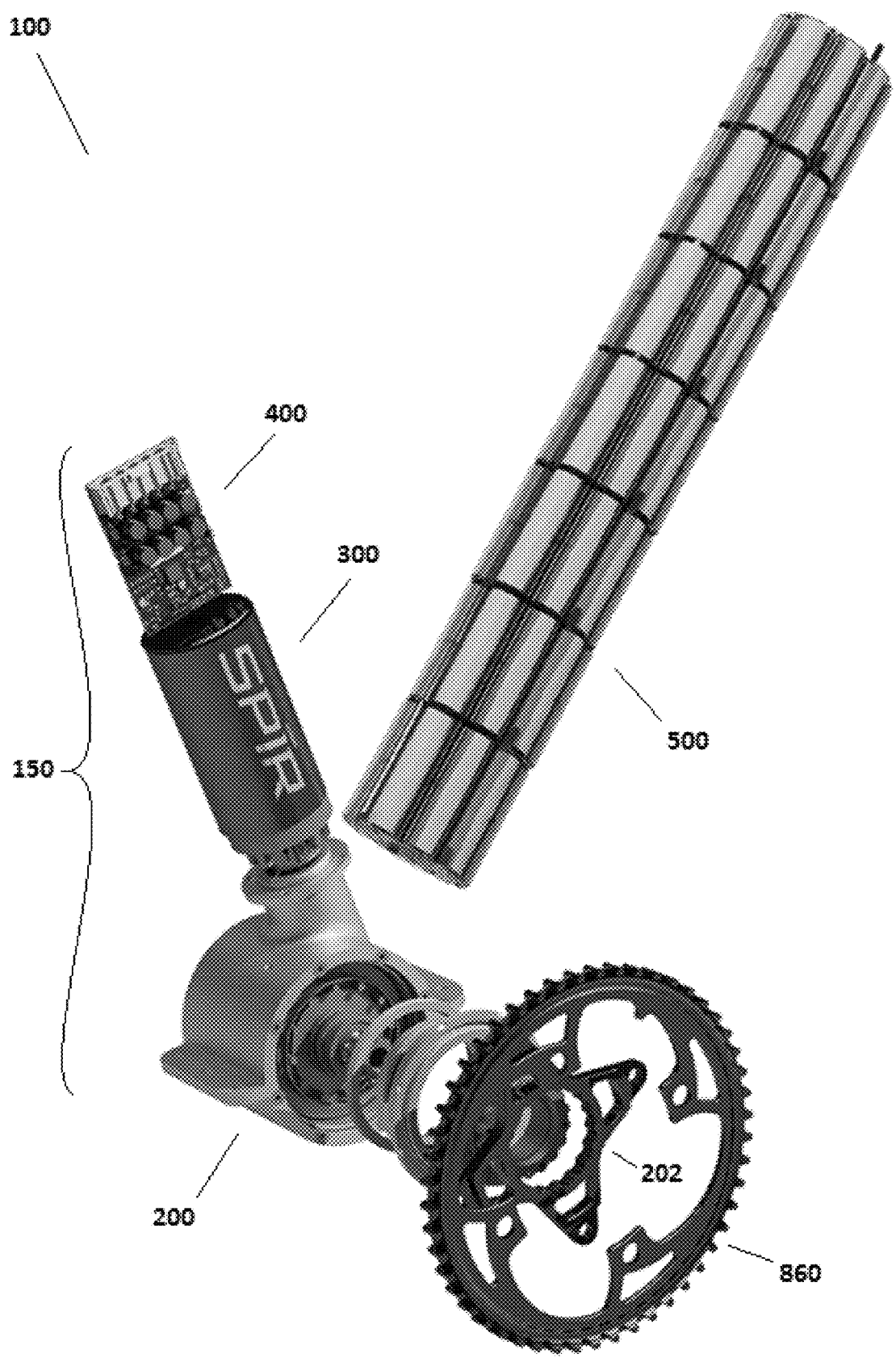
FIG. 1 is a perspective illustration of example components of an integrated electric bicycle drive system according to various example embodiments.

Turning to FIG. 1, shown is a perspective illustration of example components of an integrated electric bicycle drive system 100 according to various example embodiments, including an example drive system 200, electric motor 300, controller 400, and longitudinally-extending battery pack 500. The drive system 200, electric motor 300, and motor controller 400 are mechanically connected, and together constitute an integrated unitary motor-controller-drive system 150. Also shown in FIG. 1 is an output spider 202 that is driven by the drive system 200, and which connects with and drives a sprocket 860. Some or all of these components may be provided together as a kit to add electric power to bicycles having frames with hollow portions.

Figure 2:
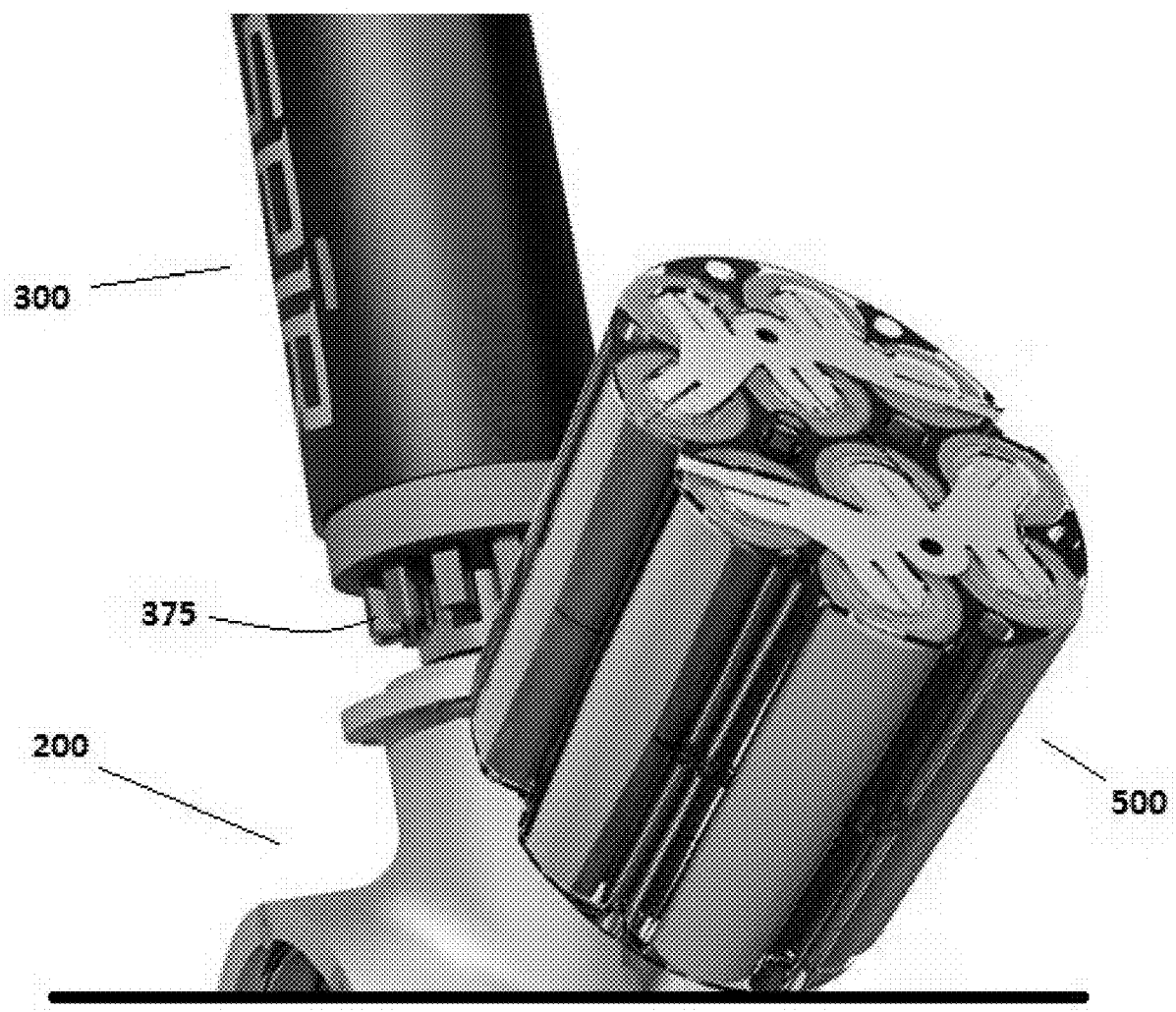
FIG. 2 is a closer view of the example components of FIG. 1, showing an example longitudinally-extending battery pack partially cut-away.

FIG. 2 is a closer view of the example components of FIG. 1, showing an example motor mount 375. Alternatively or additionally, a self-aligning, vibration-isolating motor mount like that described in the '356 Application may be used.

Figure 3:
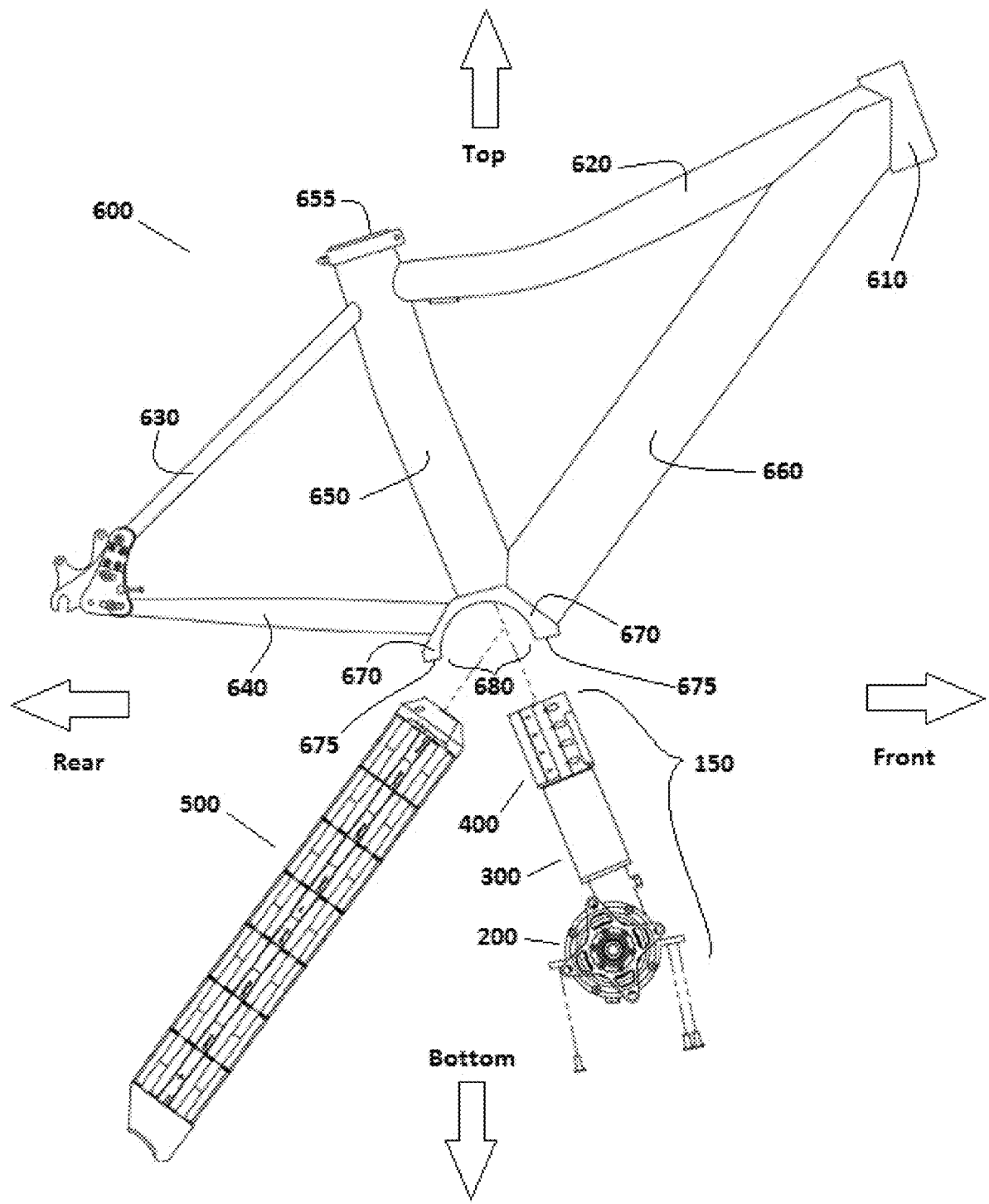
FIG. 3 is an exploded right side elevation view of example components of an integrated electric bicycle drive system, illustrating the removal or replacement of an example integrated unitary motor-controller-drive system and an example longitudinally-extending battery pack through an open bottom portion of a bottom bracket shell of an example bicycle frame according to various example embodiments.

FIG. 3 is an exploded right side elevation view of example components of an integrated electric bicycle drive system 100, illustrating the removal or replacement of an example integrated unitary motor-controller-drive system 150 and an example longitudinally-extending battery pack 500 through an open bottom portion 680 of a bottom bracket shell 670 of an example bicycle frame 600 according to various example embodiments. The example frame 600 may be constructed entirely or in part from hollow tubes of any suitable material, such as aluminum, steel, carbon fiber or other composite material, and in FIGS. 3 and 4 comprises a head tube 610, top tube 620, right seat stay 635, left seat stay 635, right chain stay 640, left chain stay 645, seat tube 650, hollow interior 651 of seat tube 650, seat tube top 655, down tube 660, hollow interior 661 of down tube 660, bottom bracket shell 670, and drive system mounting surfaces 675 on the bottom of the bottom bracket shell 670 and on either side of the open bottom portion 680 of the frame 600. Any or all of the tubes comprising the frame 600 may have any suitable cross-sectional shapes, such as round or oval, for example.

Figure 4:
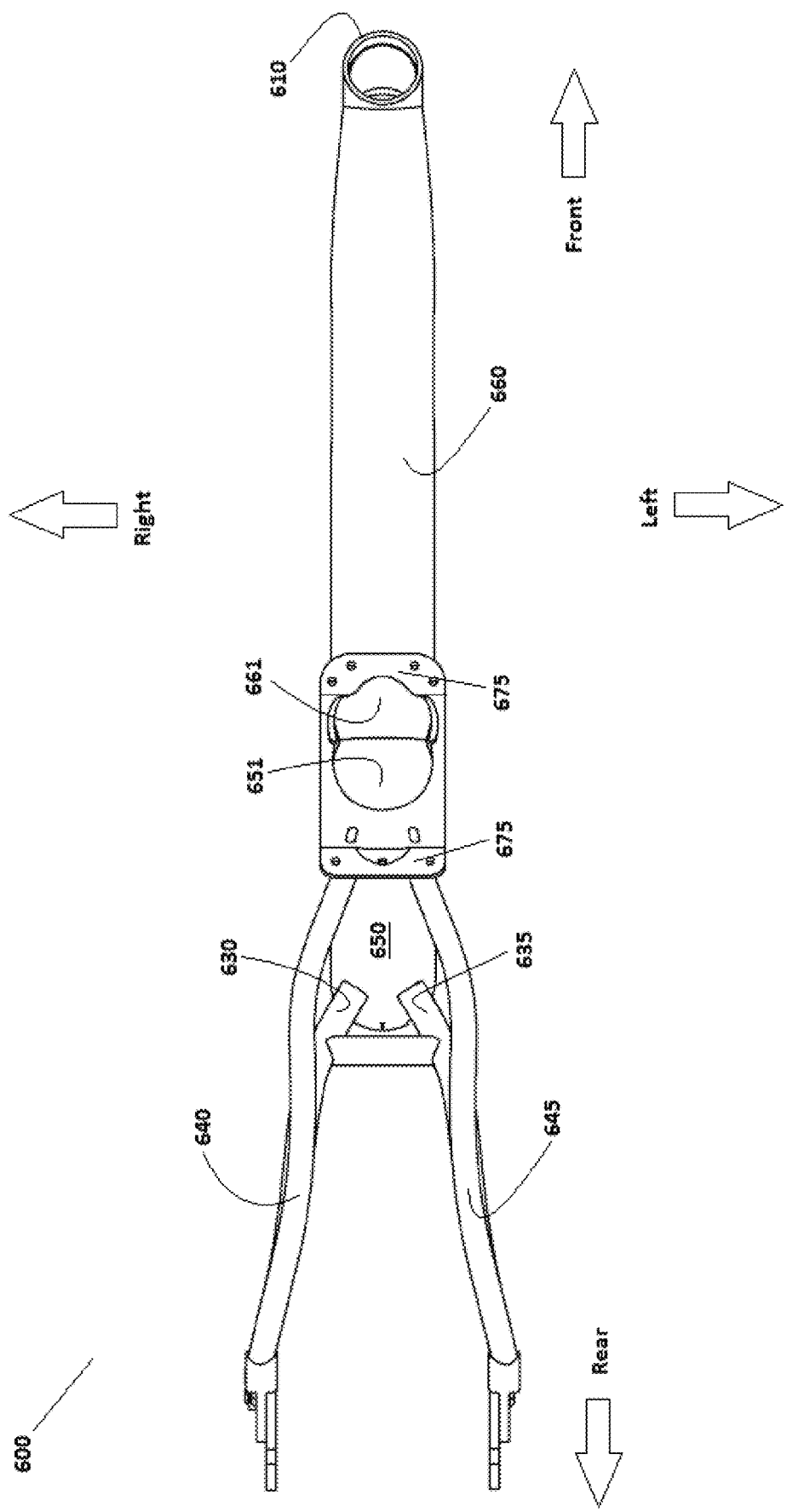
FIG. 4 is a bottom plan view of the example bicycle frame of FIG. 3, showing the open bottom portion of the bottom bracket shell according to various example embodiments.

FIG. 4 is a bottom plan view of the example bicycle frame 600 of FIG. 3, better showing the drive system mounting surfaces 675 on the bottom of the bottom bracket shell 670 and on either side of the open bottom portion 680 of the frame 600 according to various example embodiments. Since the bottom of the bottom bracket shell 670 is open, access is provided there-through to the hollow interior 651 of seat tube 650 and to the hollow interior 661 of the down tube 660.

Figure 5:
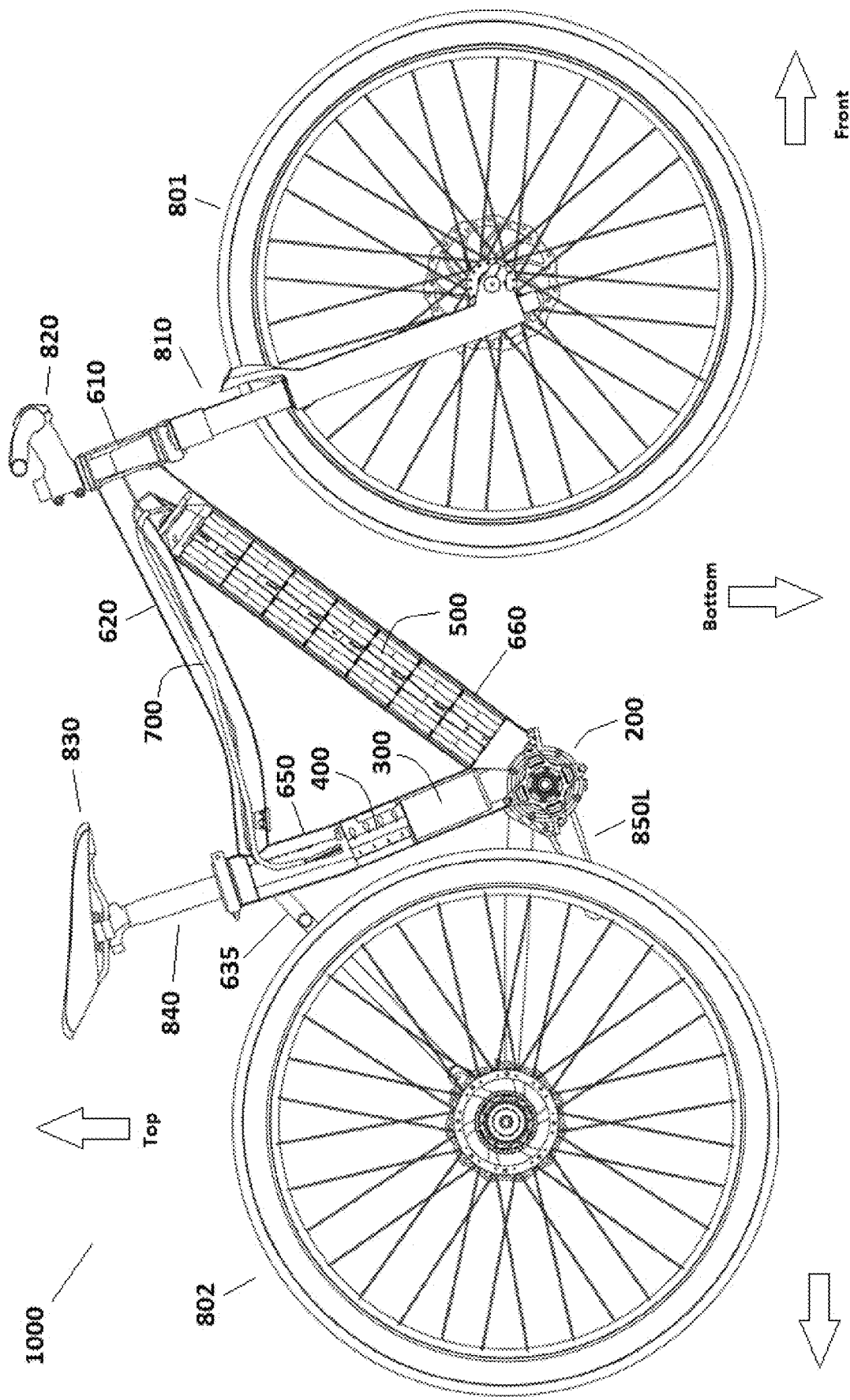
FIG. 5 is a right side elevation view of an example bicycle having an electric bicycle drive system integrated into the frame according to various example embodiments, with portions of the frame cut-away to illustrate various example components located within the frame.

FIG. 5 is a right side elevation view of an example bicycle 1000 having an electric bicycle drive system 100 integrated into the frame 600 according to various example embodiments, with portions of the frame 600 cut-away to illustrate various example components located within the frame 600. The longitudinally-extending battery pack 500 has been inserted through the open bottom portion 680 of the frame 600 into the hollow interior 661 of the down tube 660, then the integrated unitary motor-controller-drive system 150 has been inserted through the open bottom portion 680 of the frame 600 into the hollow interior 651 of seat tube 650. The integrated unitary motor-controller-drive system 150 is in electrical communication with the longitudinally-extending battery pack 500 by wiring 700 passing through the interior of top tube 620 and connecting them to provide power from the batteries 500 to the motor controller 400 and the electric motor 300. The integrated unitary motor-controller-drive system 150 may be attached with the frame 600 with fasteners (not shown) passing through the frame mounting surfaces 212 (FIG. 7) of the drive system 200 and into the drive system mounting surfaces 675 on the bottom of the bottom bracket shell 670 of the frame 600, such that the drive system housing 210, 216 (FIG. 9) covers the open bottom portion 680 of the frame 600.

In various example embodiments, the motor 300 may be cylindrically shaped and smaller in cross-sectional diameter than the inside diameter of the hollow interior 651 of the seat tube 650. A motor mount may be provided as described in more detail in the '356 Application, which is incorporated herein by reference, that features an inner sleeve with an inside diameter that fits the cylindrical motor 300. Such an inner sleeve may be radially coupled to an outer sleeve using metallic or heat-conductive fins. The outer sleeve outside diameter may fit into the seat tube 650. The voids between each heat-conductive fin may be filled with an acoustic-damping material. The heat from the motor 300 may be first conducted to the inner sleeve, then to the heat fins, then to the outer sleeve, and finally to the seat tube 650. To prevent the motor 300 from spinning within the inner sleeve, a pin or fastener can hold the motor 300 in place. To prevent the entire motor assembly from spinning within the seat tube 650, a faster or pin can be used, or the tube 650 can be non-circular.

While in the example embodiments shown the motor 300 and controller 400 of the integrated unitary motor-controller-drive system 150 are located in the seat tube 650, in alternative embodiments those components can be located in a different tube, such as down tube 660, and the batteries 500 can be located in the seat tube 650 or some other part(s) of the frame 600.

Figure 6:
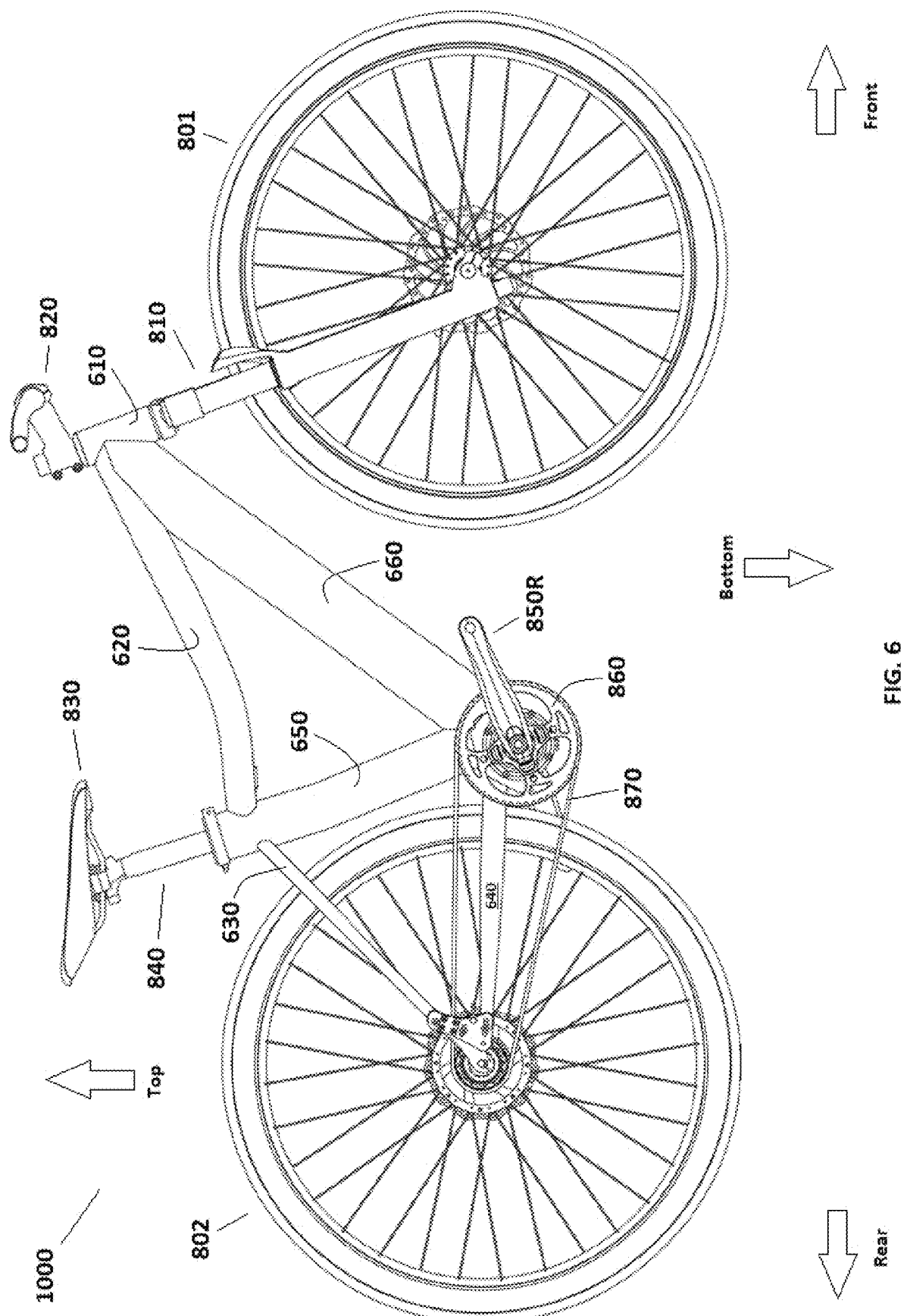
FIG. 6 is a right side elevation view of the example bicycle of FIG. 5, shown complete with the frame intact (except pedals not shown).

Other example components of bicycle 1000 shown in FIGS. 5 and 6 include a front wheel 801, rear wheel 802, front forks 810, handlebars 820, seat 830, seat post 840 extending into the interior 651 of seat post tube 650, left crankshaft 850L, right crankshaft 850R, drive sprocket 860, and a chain or belt 870 driveably connecting drive sprocket 860 with the rear wheel 802. Pedals are not shown mounted near the outer ends of left crankshaft 850L and right crankshaft 850R, but it is understood that in use pedals are located thereon for a rider to apply force against with the rider's feet to pedal the bicycle.

FIG. 6 is a right side elevation view of the example bicycle 1000 of FIG. 5, shown complete with the frame 600 intact. As evident from FIG. 6, in various example embodiments there may be little or no indication from the outside of the bicycle 1000 that it contains therein an electric motor 300, controller, 400, complex drive system 200, and large battery pack 500. Rather, in various example embodiments bicycle 1000 may be constructed to appear like a conventional bicycle having a robust but typical tube frame. This may be true even where high-performance components are used. For example, in various example embodiments the longitudinally-extending battery pack 500 may have an electrical energy capacity of at least 500, 600, 700, or even 800 or more Watt-hours. In various example embodiments the motor 300 may be capable of producing at least 450, 550, 650, or even 750 or more Watts of power, and at least 70, 80, 90 or even 100 or more Newton-meters of torque. Notwithstanding these high energy, power, and torque ratings, an integrated electric bicycle drive system 100 meeting the highest of all of those specifications, including the unitary system 150 and battery pack 500, have been developed that together weigh a total of 16 pounds or less. And this weight is located low and centrally in the bicycle 1000, facilitating good handling and balance.

With further reference to FIG. 6, a bicycle 1000 with a frame 600 incorporating an integrated electric bicycle drive system 100 meeting the highest of all the energy, power, and torque specifications listed in the immediately preceding paragraph can be packaged in frame tubes that are not overly bulky in size. For example, an integrated electric bicycle drive system 100 meeting the highest of all the energy, power, and torque specifications listed in the immediately preceding paragraph can have an electric motor 300 and controller 400 that both have cross-sectional areas less than 4.9 square inches, and a longitudinally extending battery pack 500 with a cross-sectional area of 24.9 square inches or less (each measured in a plane perpendicular to its longitudinal axis). Accordingly, provided in various example embodiments is a bicycle 1000 with a frame 600 having integrated therein an electric bicycle drive system 100 meeting the highest of all the energy, power, and torque specifications listed in the immediately preceding paragraph, wherein the interior 651 of the seat tube 650 has a cross-sectional areas no more than 5 square inches, and the interior 661 of the downtube 660 has a cross-sectional areas no more than 25 square inches (each measured in a plane perpendicular to its longitudinal axis).

Figure 7:
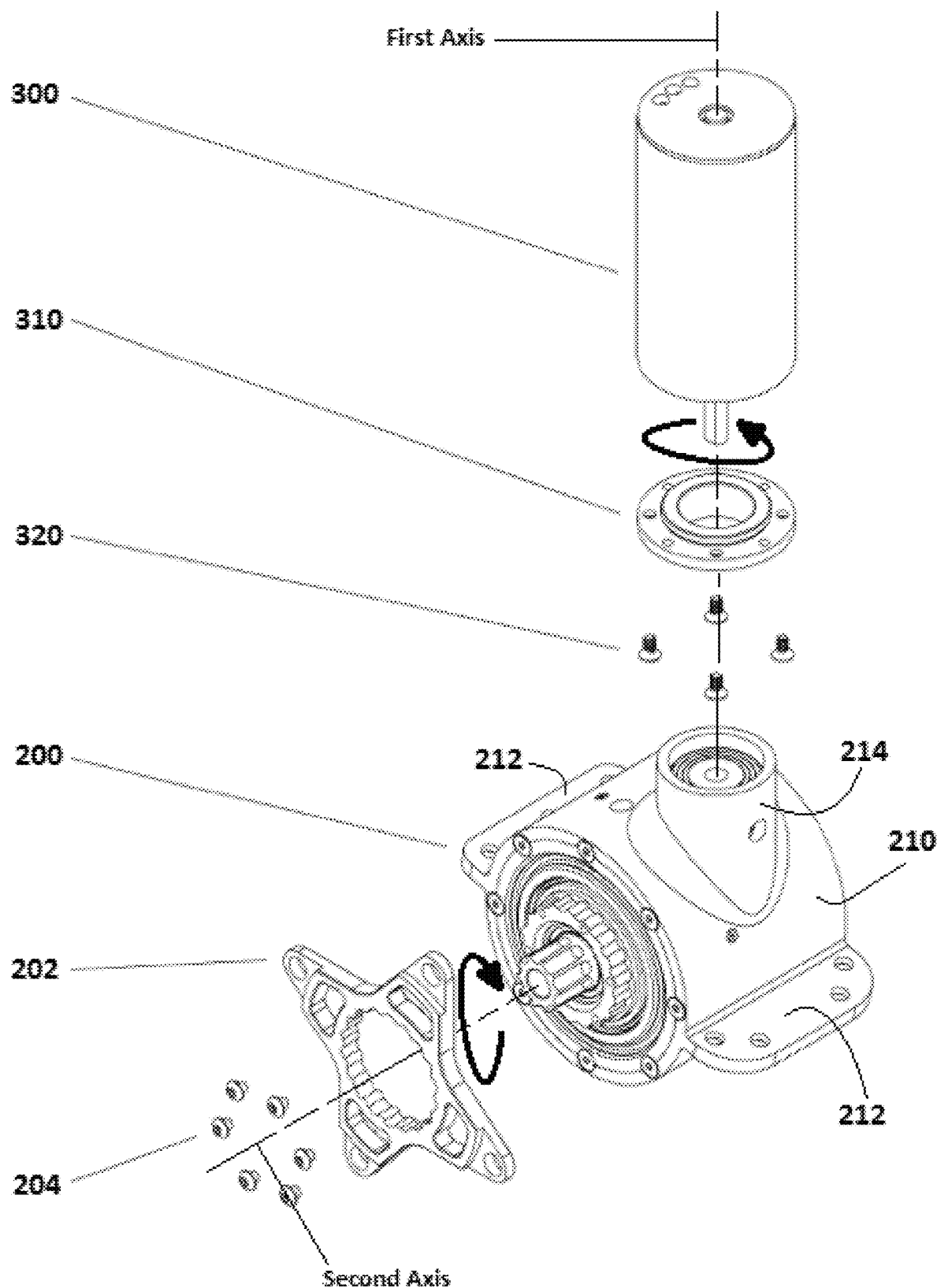
FIGS. 7, 8, and 9 are partially exploded perspective views of example components of an integrated unitary motor-controller-drive system according to various example embodiments.
Figure 8:
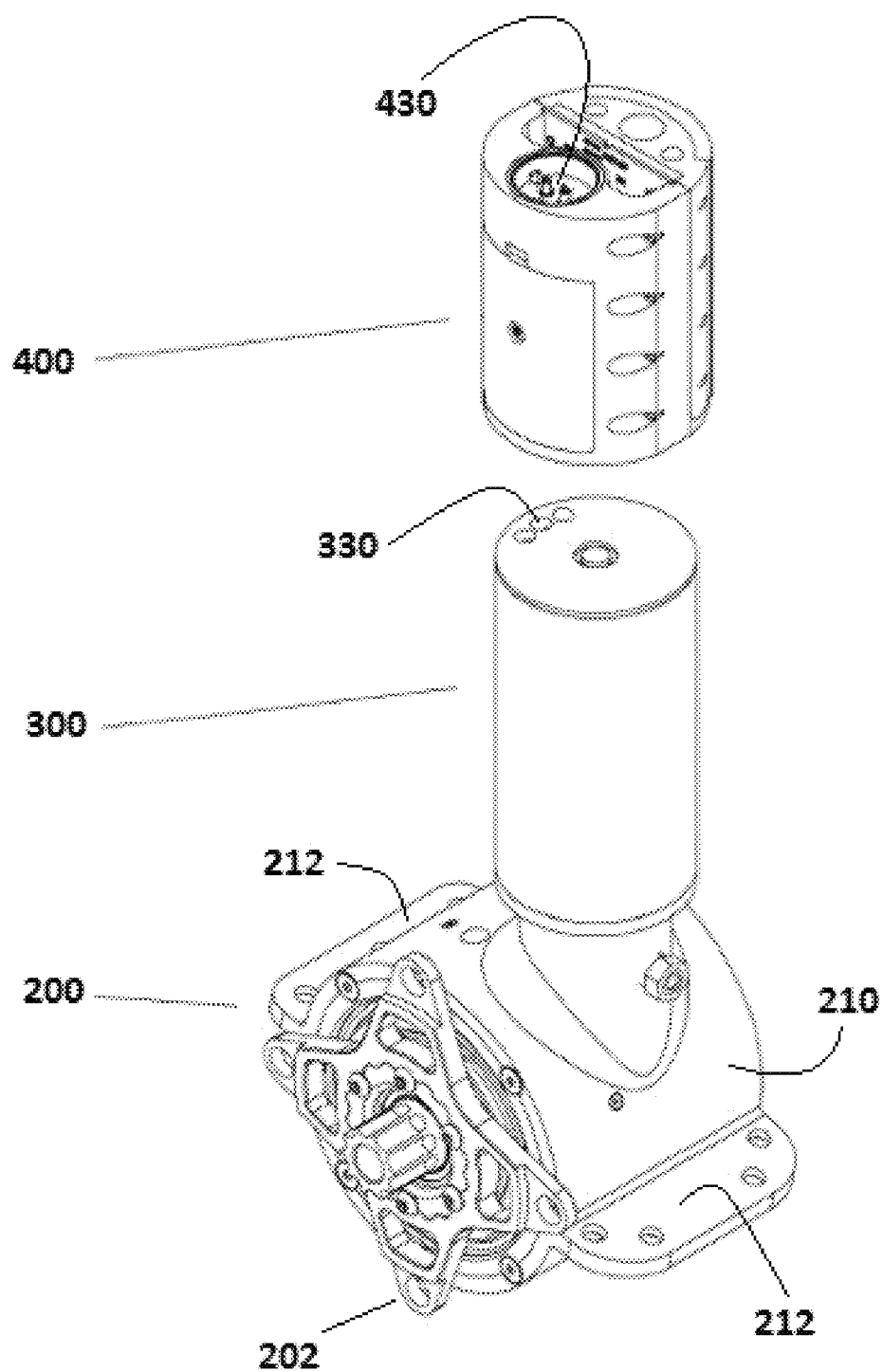
Figure 9:
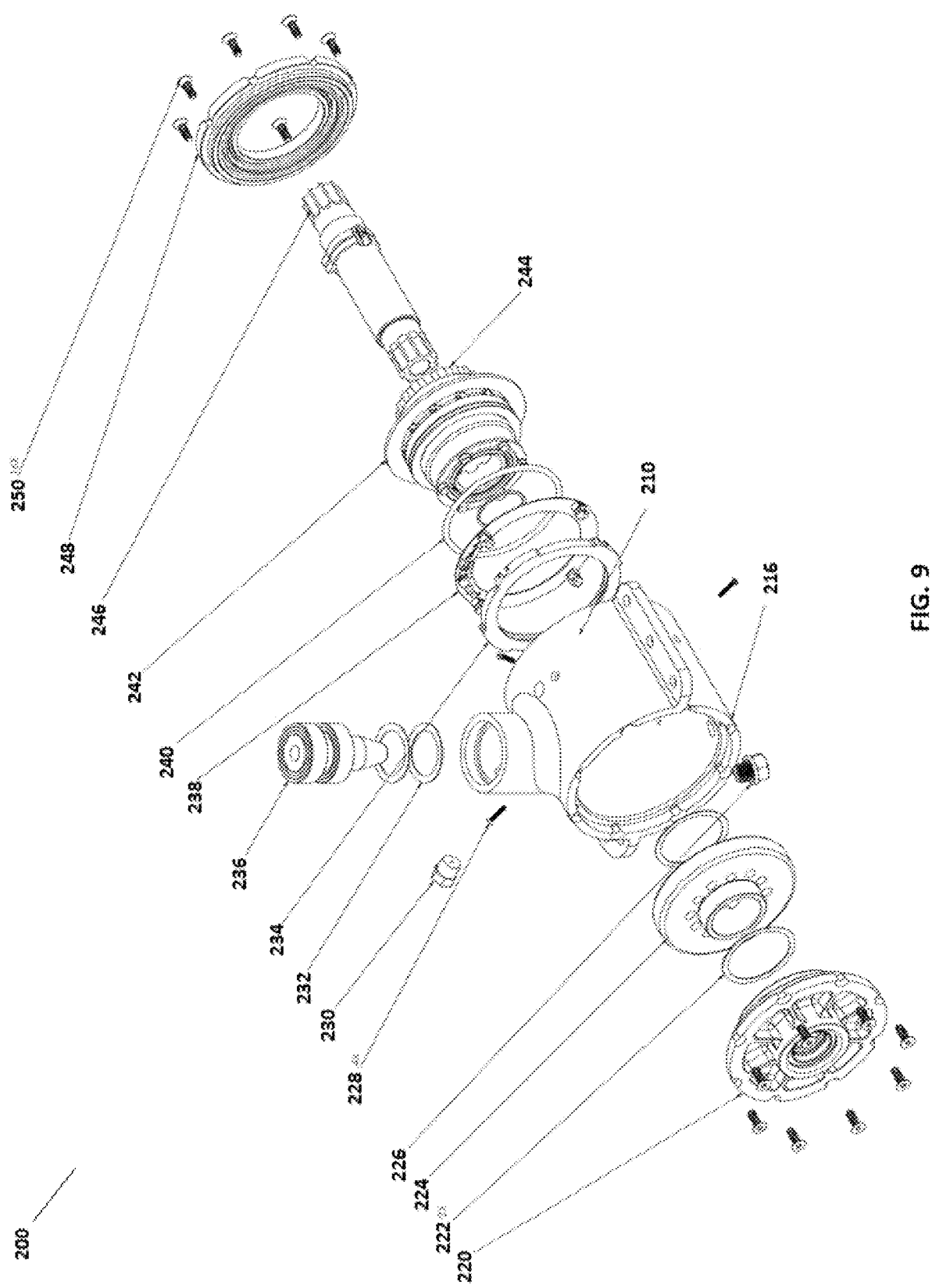

FIGS. 7, 8, and 9 are partially exploded perspective views of example components of an integrated unitary motor-controller-drive system 150 according to various example embodiments. FIG. 7 depicts an example drive system 200 having a housing 210 with a motor mounting tower 214 constructed to be mechanically coupled with an electric motor 300 via a motor-to-housing adapter 310 and fasteners 320, where the drive system 200 is configured to receive from the electric motor 300 rotational power about a first axis (depicted in FIG. 7) and to transmit said rotational power to an output spider 202 rotatable about a second axis perpendicular to the first axis, as depicted in FIG. 7. Output spider 202 may be connected to the rest of the drive system 200 by fasteners 204, and one or more sprockets 860 (FIGS. 1, 6) may be attached to and driven in part by the output spider 202 by fasteners (not shown). Frame mounting surfaces 212 are shown on housing 210 for mounting the integrated unitary motor-controller-drive system 150 to the drive system mounting surfaces 675 on the bottom of the bottom bracket shell 670 of the frame 600.

FIG. 8 depicts an example controller 400 constructed to be mechanically connected with and in electrical communication with motor 300 via a receptacle 330 for plugging-in controller 400. Example controller 400 includes a receptacle 430 for plugging-in wiring 700 (FIG. 5). To facilitate easy assembly and removal of the various components from the frame 600, receptacle 430 and a similar receptacle (not shown) on the forward or front end of battery pack 500 may each comprise a Rosenberger-type self-locating magnetic connector (of the type available from Rosenberger Hochfrequenztechnik GmbH & Co. KG of Fridolfing, Germany) which can be connected without human access. Such connectors draw the mating ends of the connecting wiring 700 toward the receptacles 430 and make an electrical connection by magnetic attraction. Installation of components 150, 500 in a frame 600 can be accomplished in various example embodiments by fishing wiring 700 through the tubes in the frame 600 to the position shown in FIG. 5, inserting the battery pack 500 into the frame 600 and magnetically connecting a front end of wiring 700 to the front end of the battery pack 500, then inserting the unitary drive system 150 into the frame 600 and magnetically connecting the controller 400 to a rear end of wiring 700. The components 150, 500 can then be removed in reverse order by simply pulling the connection between receptacles 430 and wiring 700 apart without the need to access the connection. Electronics and programming for controllers for motors for electrically-powered bicycles are known, and further detail regarding those matters is not provided herein aside from the example information disclosed in the '356 Application, which is incorporated herein by reference.

Figure 10:
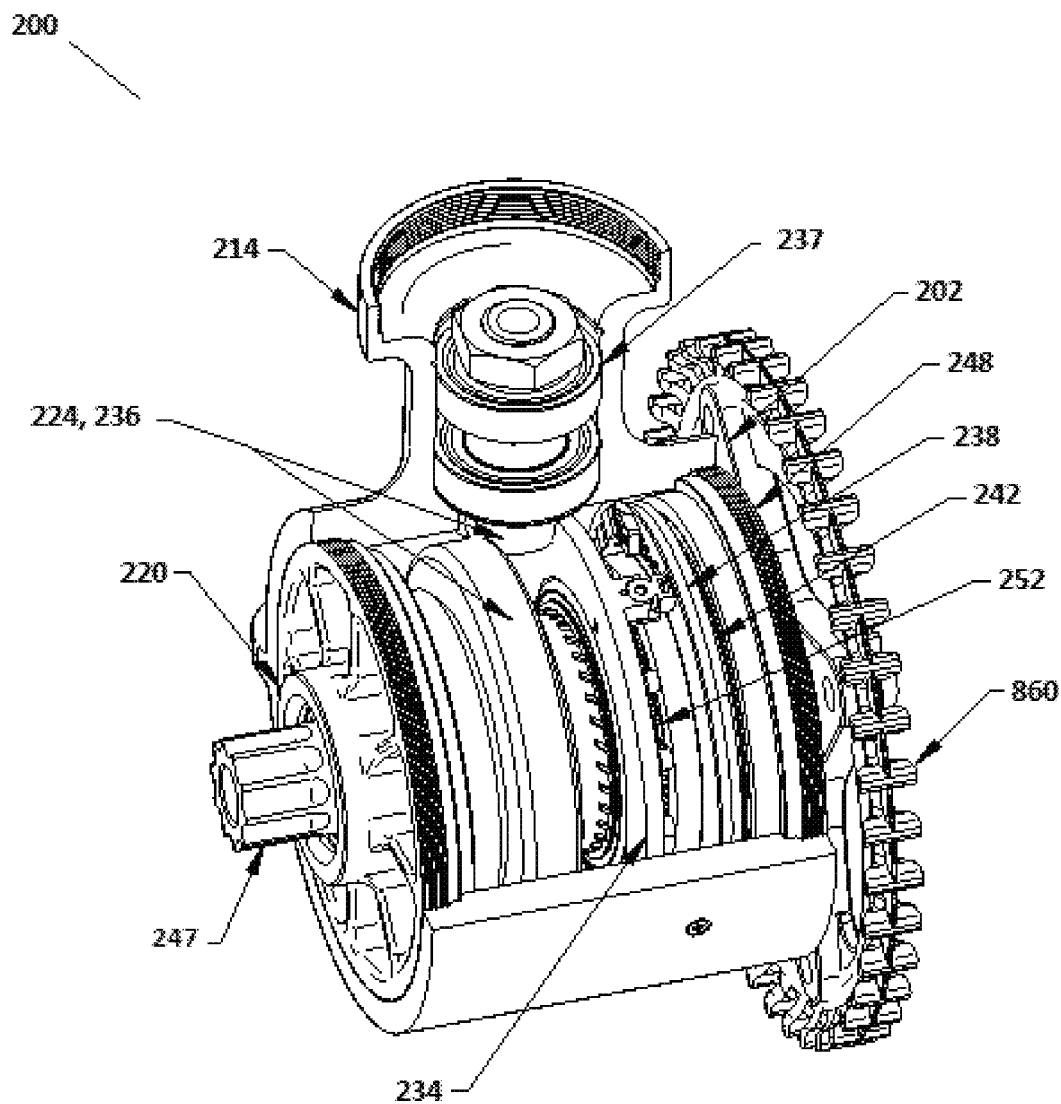
FIG. 10 is a perspective view of an example drive system according to various example embodiments, partially cut-away to illustrate various example components therein.

FIG. 9 is an exploded perspective view of example components of an example drive system 200 according to various example embodiments, and FIG. 10 is a perspective view of such an example drive system 200, partially cut-away to illustrate an example assembly of various example components therein. Such a drive system 200 may include any or all of a housing 210 including a motor mounting tower 214 portion and a lower portion 216, end cap assembly 220 for the non-drive side, washer 222, hypoid gear 224, such as a 45-tooth hypoid gear, sump plug 226, fasteners 228, pressure relief valve 230, washers 232, friction ring stop 234, pinion gear assembly 236 constructed to mesh with hypoid gear 224, hypoid and motor race bearing 237, torque sensor board 238, rubber O-ring 240, drive coupling with torque actuator assembly with torque indicator plate 242, output coupler 244, crank spindle 245, spindle-pawl-clutch assembly 246, crankshaft interface 247, end cap assembly 248 for the drive side, various fasteners 250, motor drive clutch 252, and an output spider 202 connected to a sprocket 860.

FIGS. 11, 12, 13A, 13B, 14A, and 14B illustrate example components of an example torque sensing system for use in the drive system 200 of an integrated unitary motor-controller-drive system 150, and how they may elegantly work together to accurately and precisely sense the amount of force being applied to the pedals by a rider pedaling the bicycle 1000, and to generate therefrom a signal that may be communicated to the controller 400 to control how much power is applied by the motor 300 to the drive system 200, according to various example embodiments. Torque sensing systems for modulating the power applied by the motor of an electric bicycle are known, such as that described in U.S. Pat. No. 6,196,347 B1 issued Mar. 6, 2001 to Chao et al. ("Chao"), which is hereby incorporated herein by reference. However, the present system is different from and an improvement over Chao in several important respects as will be appreciated by persons of skill in the art. Examples of the present torque sensing system may comprise a torque sensor board 238, such as that disclosed in the '356 Application, which is incorporated herein by reference, which may wirelessly measure changes in inductance created by very small relative axial movements between the sensor board 238 and a proximally-located component, such as the torque indicator plate 242 of the drive coupling with torque actuator assembly. Unlike Chao, the torque sensor board 238 may sense movements not just from a point, but from across most or all of the surface of the ring-shaped board 238 (for instance with an annular inductance coil 3100), which provides a more robust measurement. Further, the present system may measure movement with changes in inductance that are processed and then communicated digitally to the controller 400 using CAN communications by components directly on the sensor board 238, instead of measuring and communicating raw analog voltage changes produced by a Hall Effect sensor as in Chao. Numerous mechanical differences between the present invention and Chao also exist and provide improvements to component stability, lower friction, and other aspects as will be apparent to persons of skill in the art.

Figure 11:
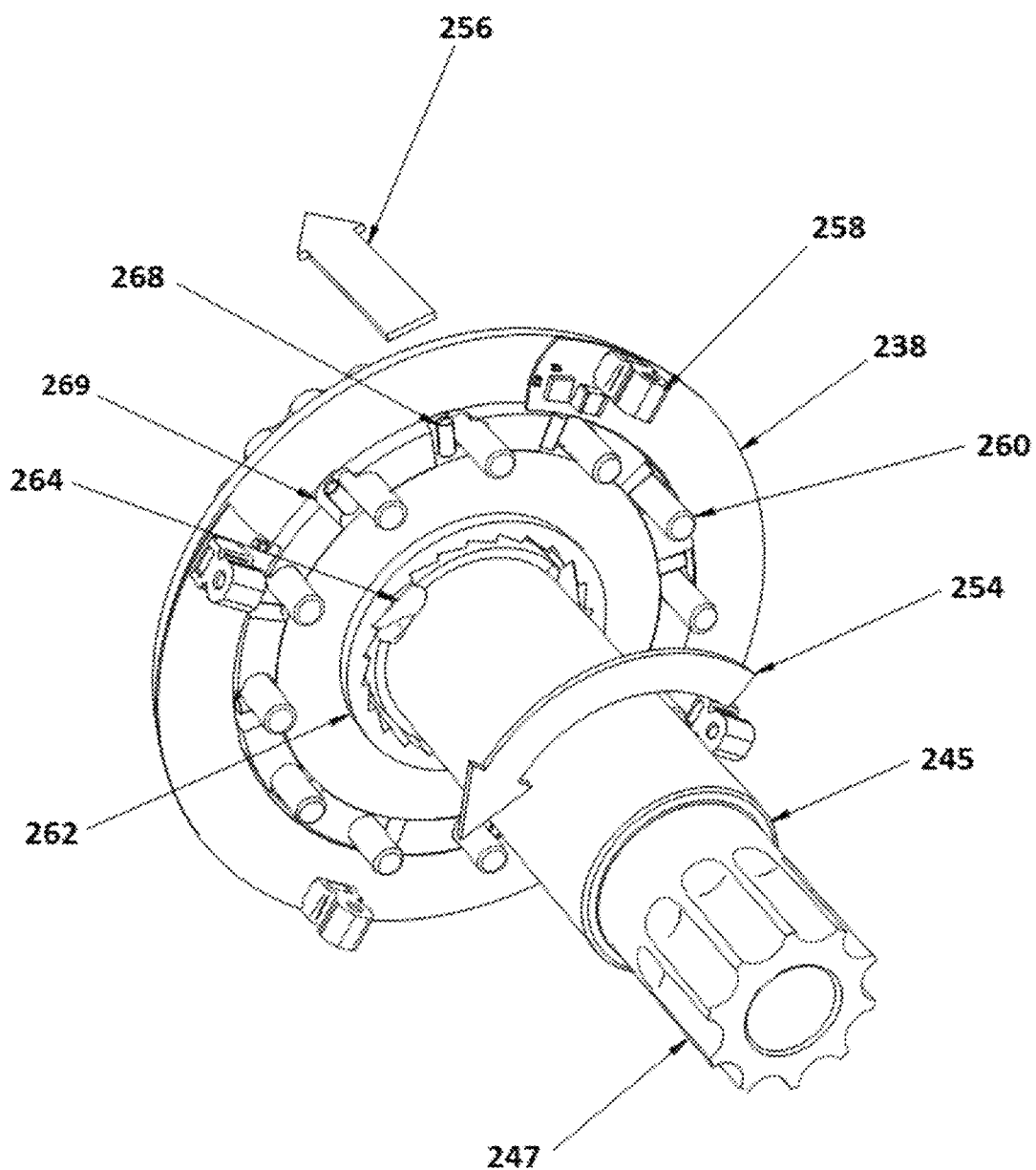
FIG. 11 is a perspective view of example components of an example torque sensing system for use in an integrated unitary motor-controller-drive system according to various example embodiments.
Figure 12:
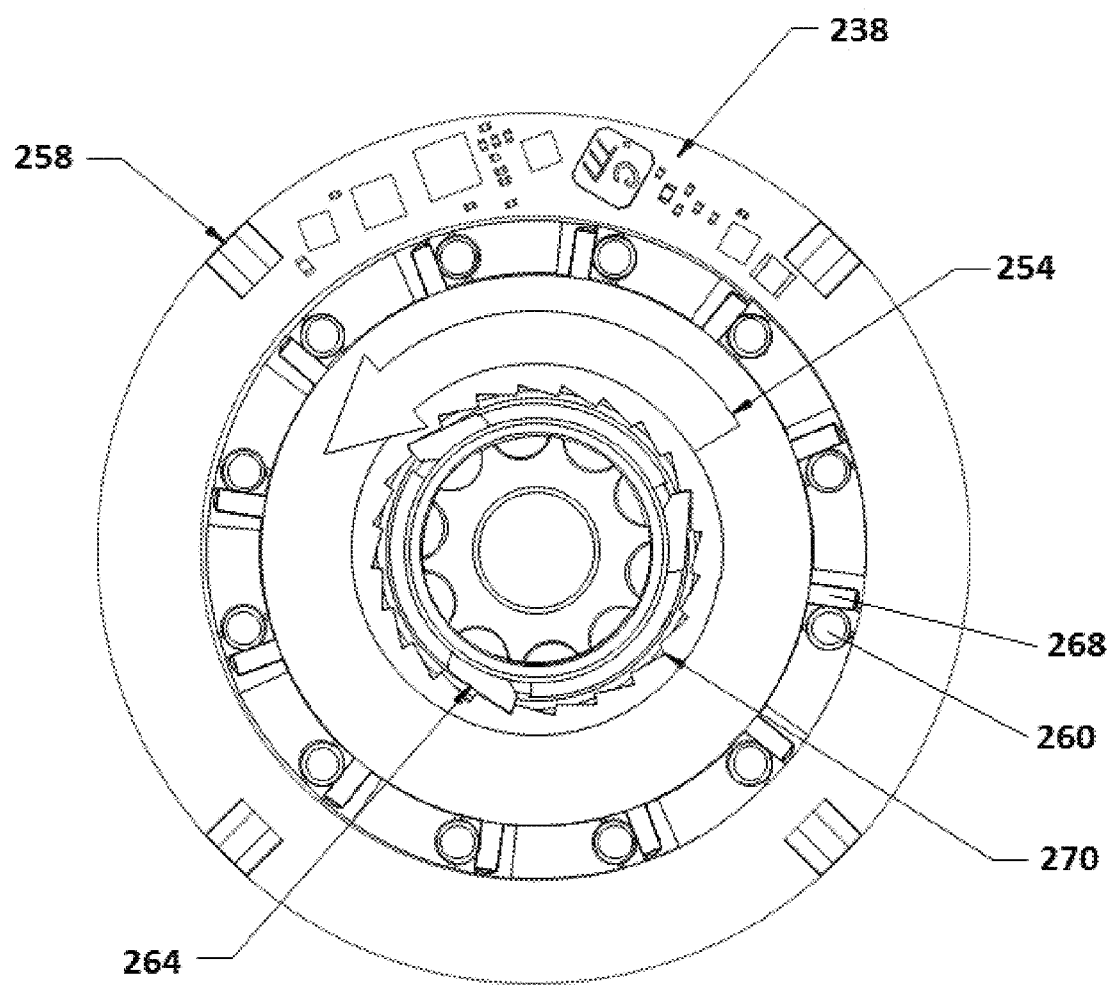
FIG. 12 is a left side elevation view of the example components of the example torque sensing system of FIG. 11.
Figure 13A:
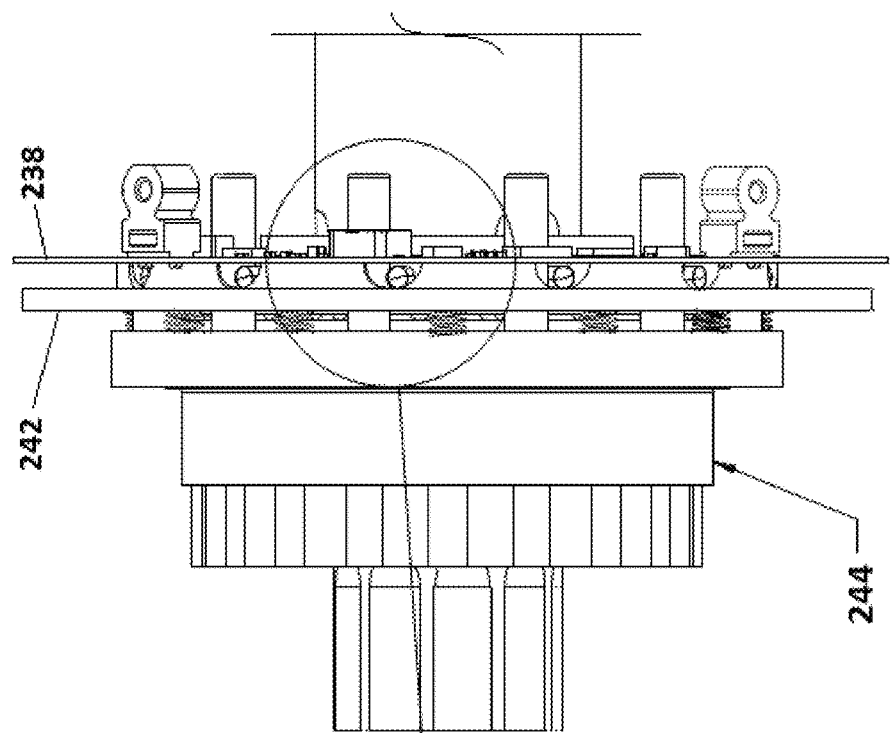
FIG. 13A is a front side elevation view of the example components of the example torque sensing system of FIG. 11, shown in a low or zero torque condition.
Figure 13B:
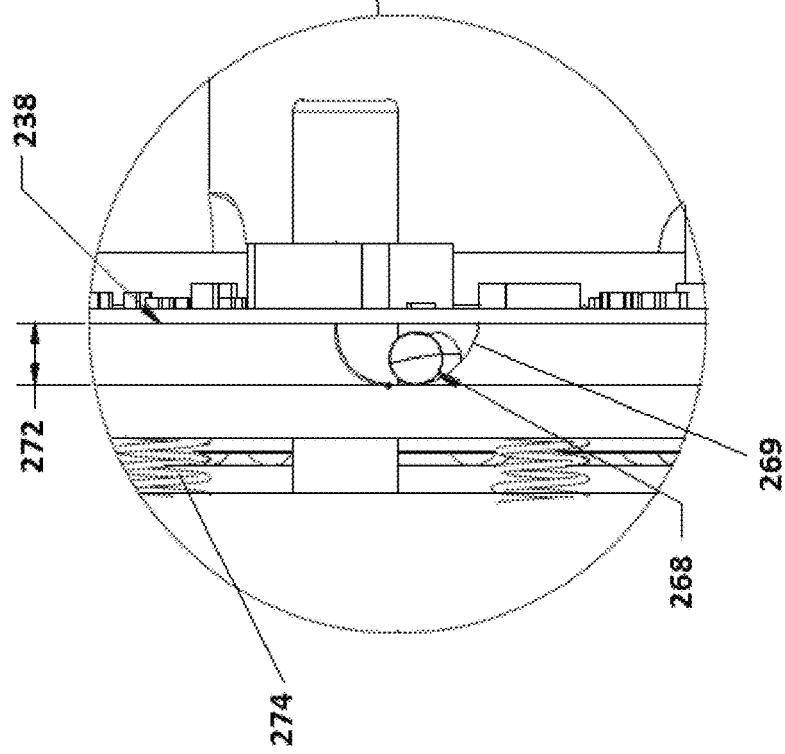
FIG. 13B is closer view of a portion of FIG. 13A.
Figure 14A:
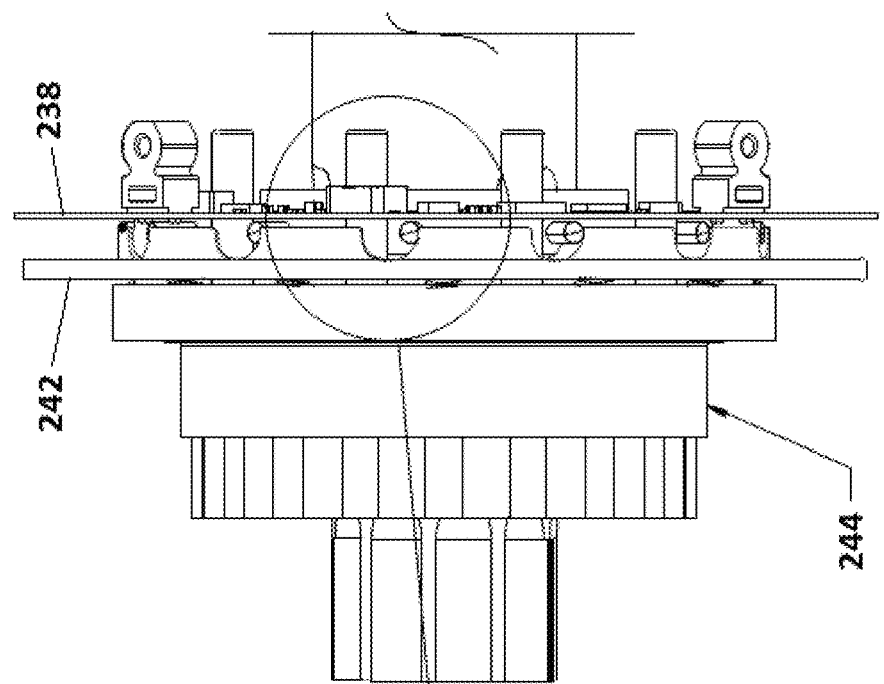
FIG. 14A is a front side elevation view of the example components of the example torque sensing system of FIG. 11, shown in a high torque condition.
Figure 14B:
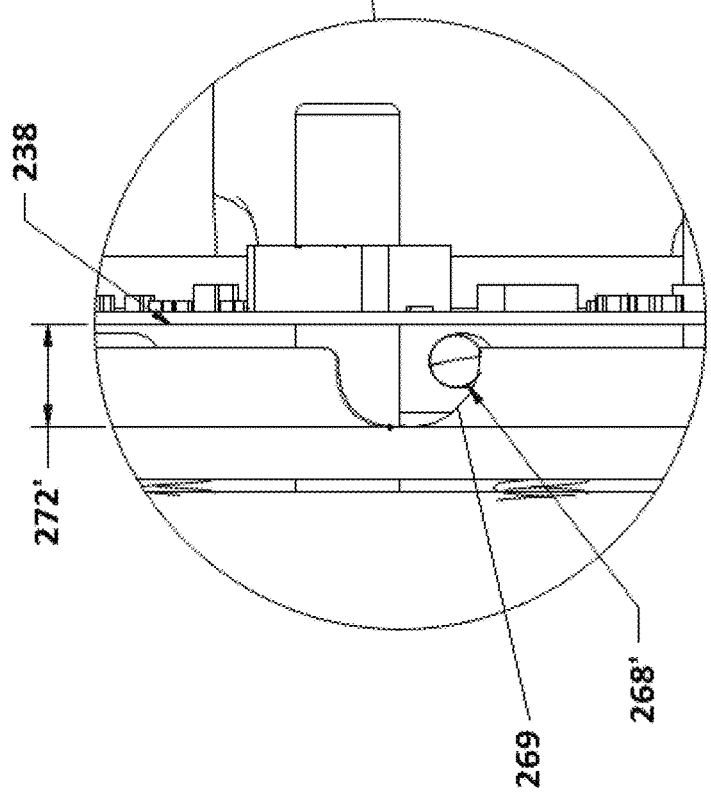
FIG. 14B is closer view of a portion of FIG. 14A.
Figure 15A:
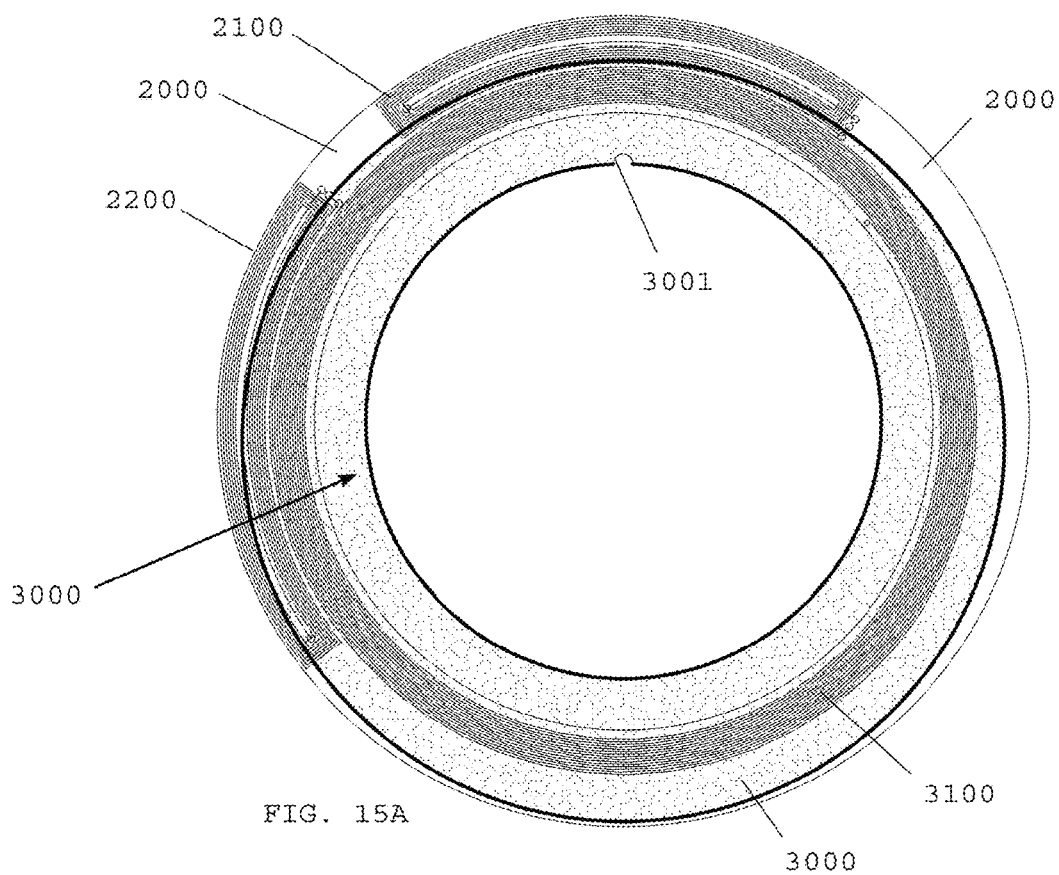
FIGS. 15A through 15D depict a feedback plate rotating step-wise eccentrically counter-clockwise in ninety degree steps relative to a printed circuit board as part of an input power measuring system utilizing relative movement between a conductive or otherwise magnetically permeable member and inductance coils, according to various example embodiments.
Figure 15B:
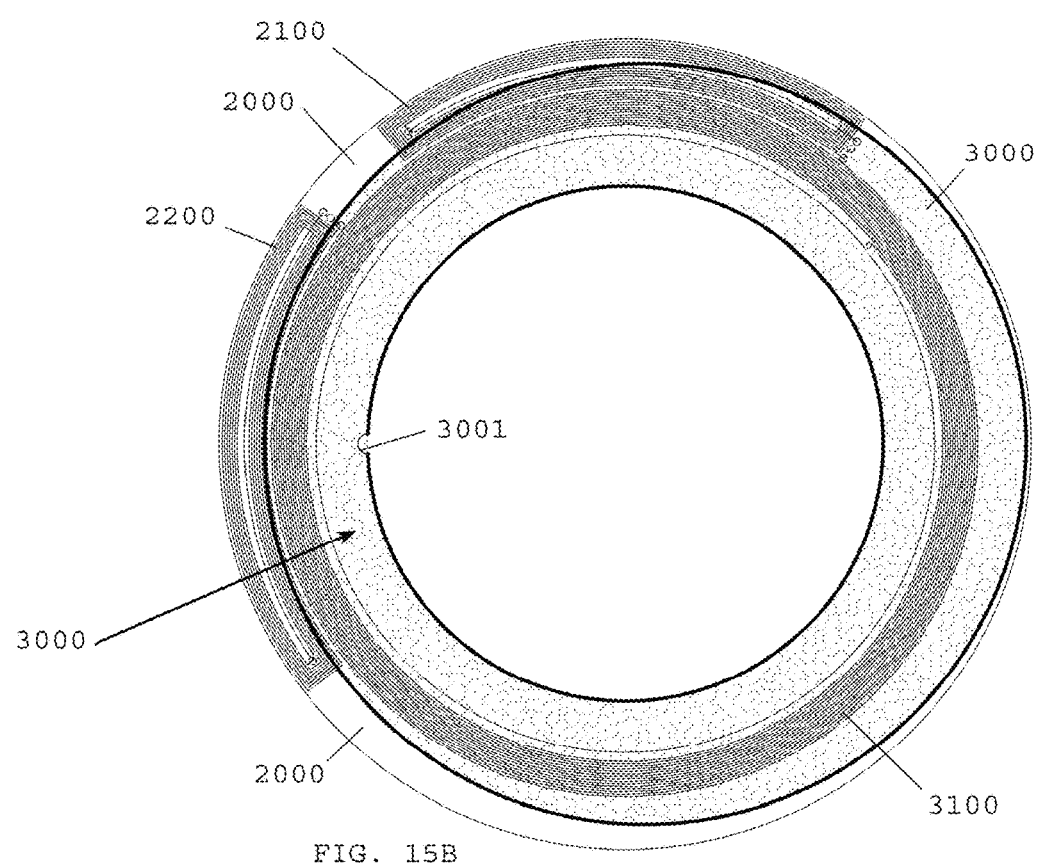
Figure 15C:
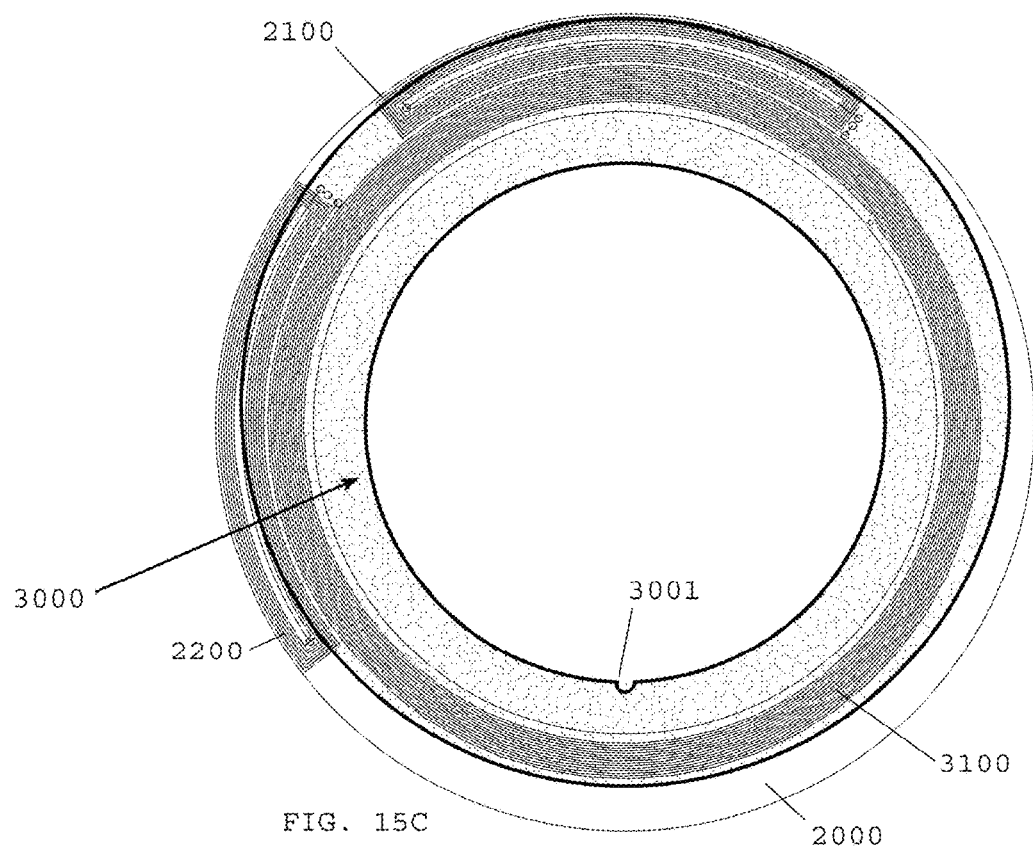
Figure 15D:
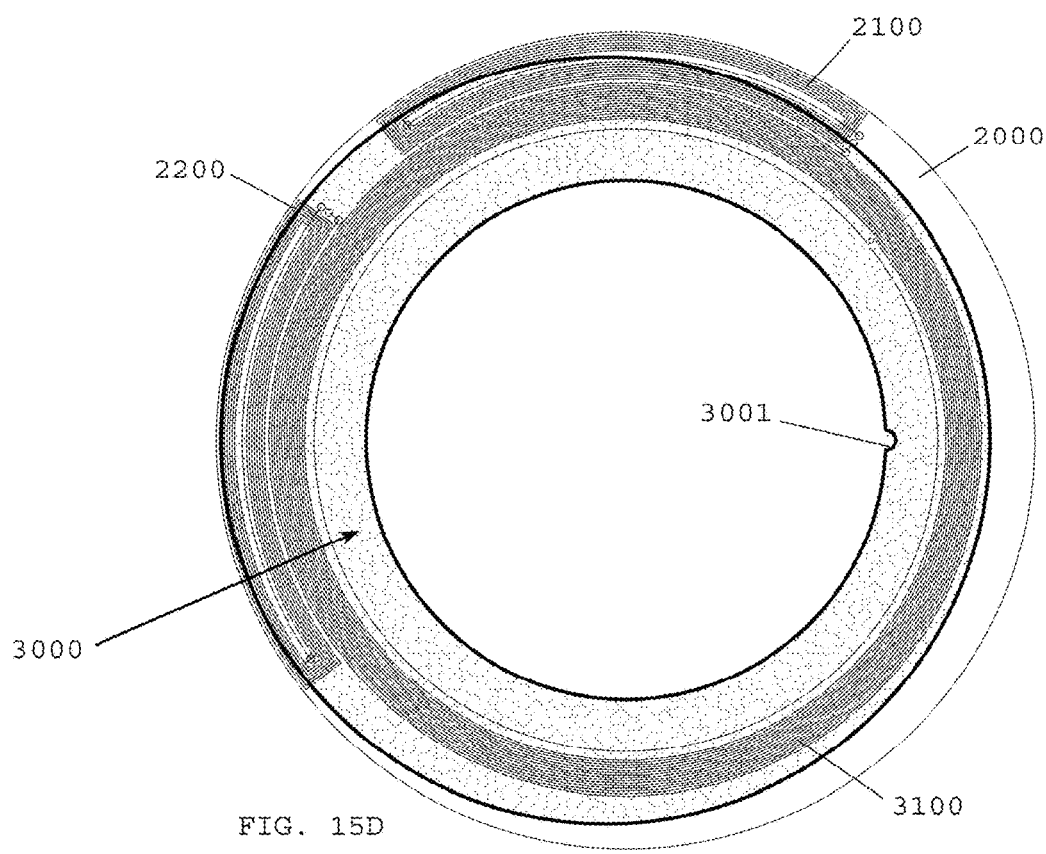

With continuing reference to FIGS. 11-14B, torque sensor board 238 may include mounting posts 258 to mount the torque sensor board 238 to the motor drive clutch 252 as shown in FIG. 10. In addition to torque sensor board 238, example components of a torque sensing system for use in the drive system 200 may include a crank spindle 245 that is driven in the direction indicated by arrow 254 by rider-provided pedaling force via pedals (not shown) connected to cranks 850L, 850R (FIG. 6), which are connected to crankshaft interfaces 247 on crank spindle 245. The rider (not shown) is able to freewheel by pedaling in the backward rotational direction by the action of pivoting clutch pawls 264 biased toward and locking with a torque collar 262 of the ratcheting clutch 270 in the forward direction 254 but not in the opposite direction. When the rider increasingly applies torque in the forward direction 254 to the drive system 200 by pedaling the bicycle 1000 with more than a predetermined amount of force predetermined in part by the preload of springs 274, the torque indicator plate 242 of the drive coupling with torque actuator assembly rotates slightly in the forward direction 254 relative to the torque sensor board 238 and ramp pins 268 move along curved ramp or cam surfaces 269 between first low or no-torque positions shown in FIGS. 13A and 13B and second maximum torque positions 268' as shown in FIGS. 14A and 14B. Since surfaces 269 are curved, this movement of pins 268 along surfaces 269 causes the torque actuator assembly to compress springs 274 and move axially away from the torque sensor board 238 in direction 256 (FIG. 11) from an initial low or no-torque distance 272 up to a maximum second "high torque" distance 272', as shown in FIGS. 13B and 14B. The electronics on the torque sensor board 238 (such as annular inductance coil 3100) sense a change in inductance corresponding to the magnitude of the movement between 272 and 272' and convert that change inductance to a digital control signal that is communicated to controller 400 for controlling the output of the motor 300. Guide pins 260 may also be provided as shown in FIGS. 11 and 12 for instance to limit movement of the pins 268.

In addition to measuring the pedaling torque input by the rider, the system may also include means for simultaneously measuring the rotational direction of the rider's movements of the cranks 850R, 850L and the rotation rate or speed that the rider is pedaling, called rider cadence, for instance using a structure like that shown in FIGS. 15A-15D. This data may be communicated to the vehicle controller 400 to determine when to engage and disengage the motor drive clutch 252 and how much power the motor 300 should apply to the drive system 200. This data can also be used to assess rider input power or wattage, which is proportional to a signal indicating the rider's input torque multiplied by a signal indicating the forward rotational speed or cadence of the rider's cranks 850R, 850L. This system considers both torque and forward rotational speed or cadence to determine an appropriate level of motor assistance, because using the rider's input force or torque alone can skew the appropriate motor assistance calculation as the rider's input cadence increases.

With continuing reference to FIGS. 11, 12, 13A, 13B, 14A, 14B and 15A-15D, a single electromechanical unit may include contactless sensors that together sense rider input torque, rider peddle speed (cadence), and the direction of rotation at the crank spindle 245. In addition to the inductance-based torque sensing system shown and described with respect to FIGS. 11, 12, 13A, 13B, 14A, and 14B, two inductance coils 2100, 2200 may be placed in non-equally-spaced-apart locations (such as ninety degrees apart) on a printed circuit board 2000 as shown in FIGS. 15A-15D, concentric with the rotation of the spindle 245. An optional third inductance coil 3100 may be placed on printed circuit board 2000 as shown in FIGS. 15A-15D, for example an annular inductance coil 3100 concentric with the rotation of the spindle 245. Printed circuit board 2000 may be or may be attached to or comprise sensor board 238 in certain example embodiments. Feedback plate 3000 may comprise a conductive or otherwise magnetically permeable material located proximate printed circuit board 2000. Feedback plate 3000 must rotate relative to printed circuit board 2000, for instance by having printed circuit board 2000 fixed in position relative to the drive system 200 while feedback plate 3000 rotates with the rider's cranks 850R, 850L. Feedback plate 3000 may be attached to or may comprise torque indicator plate 242 in certain example embodiments. Feedback plate 3000 may be circular but is radially positioned non-concentrically relative to the spindle 245, and thus non-concentrically relative to inductance coils 2100, 2200, such that feedback plate 3000 rotates eccentrically relative to the position inductance coils 2100, 2200.

For example, FIGS. 15A through 15D depict the feedback plate 3000 rotating counter-clockwise relative to printed circuit board 2000, with location indicator 3001 on feedback plate 3000 beginning at the twelve o'clock position in FIG. A, rotating ninety degrees counter-clockwise to the nine o'clock position in FIG. B, then rotating another ninety degrees counter-clockwise to the six o'clock position in FIG. C, and rotating an additional ninety degrees counter-clockwise to the three o'clock position in FIG. D, after which continuing rotation of feedback plate 3000 in the counter-clockwise direction would return location indicator 3001 to the position shown in FIG. A, to be repeated with each full counter-clockwise rotation of the rider's cranks 850R, 850L. This eccentric action creates an oscillation in the position of the feedback plate 3000 relative to the inductance coils 2100, 2200, as the feedback plate 3000 rotates relative to printed circuit board 2000, for instance as depicted in FIGS. 15A through 15D. Alternatively, the locations of the coils and/or the non-concentric element may be reversed, as long as relative oscillating movement is created between the opposing coils when the rider rotates the cranks 850R, 850L.

Figure 16:
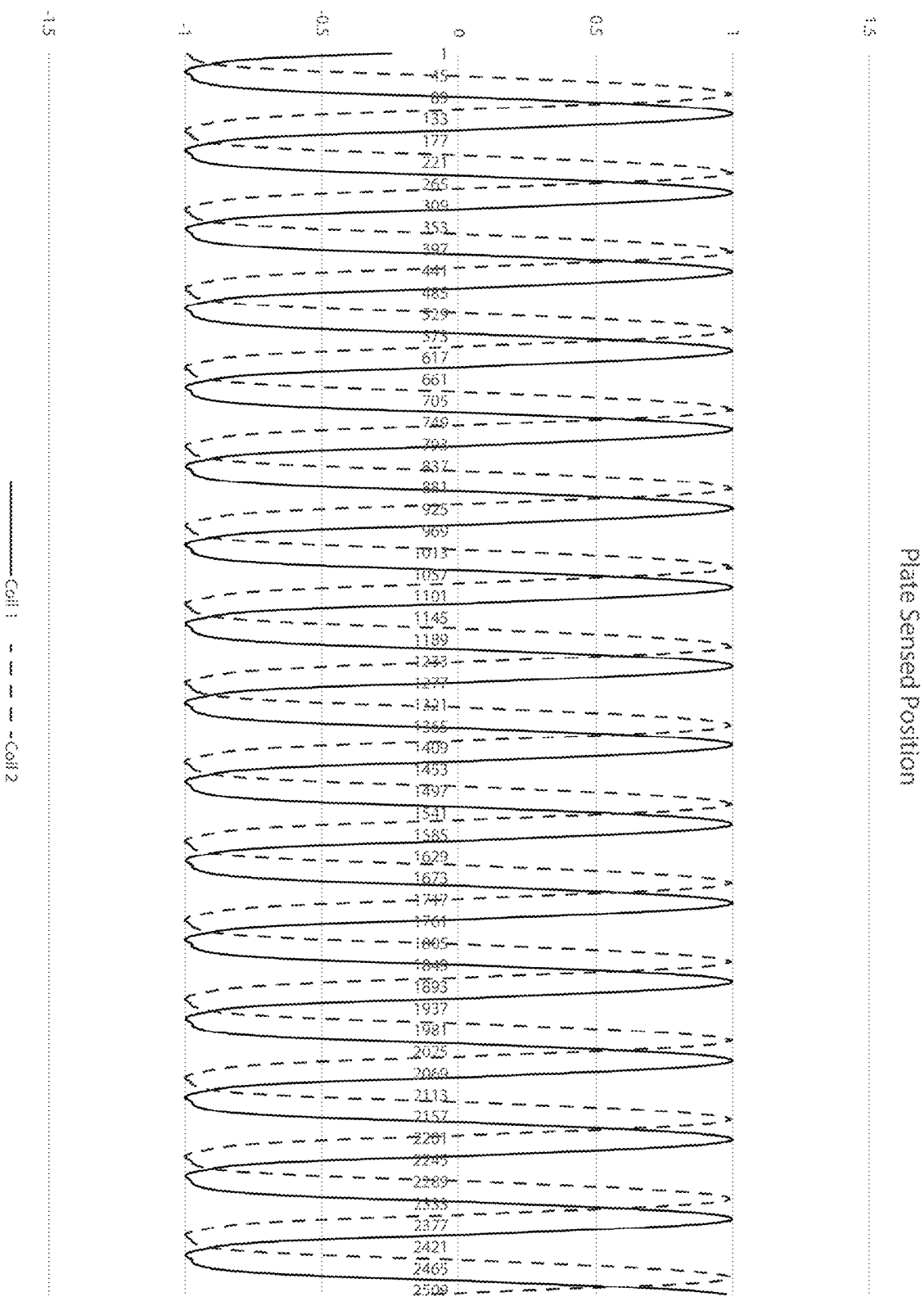
FIG. 16 is a chart depicting electrical outputs of position inductance coils (coil 1, coil 2) as a conductive or otherwise magnetically permeable member rotates through the angles shown in degrees on the central axis of the chart, according to various example embodiments.

Repeated eccentric rotation of feedback plate 3000 relative to the position inductance coils 2100, 2200 as depicted in FIGS. 15A through 15D causes the coils 2100, 2200 to generate and output signals having sinusoidal waveforms that are ninety degrees out of phase between the first inductance coil 2100 and the second inductance coil 2200. An example of this type of output is depicted in the chart in FIG. 16, which shows the electrical outputs of position inductance coils 2100 (coil 1), 2200 (coil 2) as the feedback plate 3000 rotates through the angles (shown in degrees on the central axis of the chart) relative to the position inductance coils 2100 (coil 1), 2200 (coil 2). Time (not shown) would also be overlaid and/or processed with the data shown in FIG. 16. These waveforms can be transmitted to the controller 400 (prior to or after initial processing) and processed to detect both rotational speed of the cranks 850R, 850L (e.g., via time frequency of either waveform) and rotation direction (e.g., via observing which waveform from which inductance coil is preceding the other waveform from the other inductance coil by ninety degrees).

In the example embodiments where the inductance coils 2100 (coil 1), 2200 (coil 2) are connected with the sensor board 238 that senses axial movements of the torque indicator plate 242 corresponding to rider torque input, and where the feedback plate 3000 is connected with or comprises the torque indicator plate 242 so as to rotate eccentrically relative to coils 2100, 2200, then the inductance values from the coils 2100, 2200 may be used to simultaneously measure the three desired elements of rotation speed or cadence, rotation direction, and rider input torque, from which the controller 400 or other electronics (for instance, a processor located directly on the sensor board 238) can calculate rider input power or wattage. Alternatively, optional third inductance coil 3100 can be used to provide the signal for rider torque, by measuring the changes in axial distance between the sensor board 238 and the torque indicator plate 242. Rider input power or wattage data can be used by the controller to make decisions about power output of the motor 400, which may vary depending on multiple factors including cadence for a given rider input power, and can be used with other vehicle systems and calculations. This sensor system can be a contactless design as shown and described (i.e., it is the relative position of parts that do not touch each other that is being measured by inductance). The local electronics portion of the sensor system (which may be located on the sensor board 238) need not rotate with that portion of the assembly 200 connected with the motor 300 and/or the cranks 850R, 850L, and thus, does not need to transmit power or data signals through slip-rings, wireless power, or wireless signal methods. This allows the present sensor system to remain simple, inexpensive, and robust in performance and reliability.

As illustrated and described herein and in the '356 Application that is incorporated herein by reference, in various example embodiments the drive system 200 may comprise two concentric "spindles." The inner spindle 245 functions in combination with crankshafts 850L and 850R as a traditional bicycle crankshaft, attached to the pedals (not shown) on either side of the bicycle 1000. The outer spider 202 or "outer spindle" is connected to the rear wheel 802 through a ring gear 860 and a chain, belt, shaft, or other transmission means 870. The rear wheel 802 may have a freewheel feature but it does not need one, because a freewheel or ratcheting feature is provided in the drive system 200 as disclosed herein. The outer spider 202 functions as the "e-assist," or the means by which the electric motor 300 and drive system 200 assists in driving the sprocket 860, transmission means 870, and rear wheel 802. The pinion gear assembly 236 may or may not feature a clutch or freewheel (not shown) to prevent the motor 300 from being overspun. The inner spindle 245 and outer spindle or spider 202 are coupled together with a freewheel ratchet clutch as described herein (FIG. 12), so that the outer spindle or spider 202 can rotate proportionally to the movement of the rear wheel 802, whereas the inner spindle 245 can optionally remain stationary, allowing the rider to coast without needing to pedal. This also allows the electric motor 300 to propel the bicycle 1000 independent of rider pedaling effort. In various example embodiments, modes of operation may include:

i. Rider pedaling, no e-assist. The pedals power the inner spindle 245, which connects to the outer spindle or spider 202 by catching the freewheel coupler 270. The outer spindle or spider 202 sends the power to the rear wheel 802 using the ring gear 860, chain, belt, shaft, or other transmission means 870.

ii. Rider pedaling, with e-assist. The electric motor 300 powers the outer spindle or spider 202 though the gearing 224, 236 (FIG. 10). The outer spindle or spider 202 sends the power to the rear wheel 802. The pedals power the inner spindle 245, and as long as the rider is pedaling faster than the contribution of the electric motor 300, the freewheel mechanism 270 catches and couples the inner spindle 245 with the outer spindle or spider 202, thereby adding the power of the rider and the motor 300 together.

iii. Rider coasting, with e-assist. The electric motor 300 powers the outer spindle or spider 202 through the gearing 224, 236. The outer spindle or spider 202 sends the power to the rear wheel 802. As long as the rider is pedaling slower than the speed of rotation of the outer spindle or spider 202 provided by the electric motor 300, the freewheel mechanism 270 will not catch, decoupling the inner spindle 245 from the outer spindle or spider 202.

iv. Rider coasting, with regenerative braking. As illustrated and described herein and in the '356 Application that is incorporated herein by reference, in various example embodiments a bicycle 1000 incorporating the system 100 may include regenerative braking to slow the bicycle 1000 by changing some of the kinetic energy of the moving bicycle 1000 into electrical energy to charge the batteries 500. In such embodiments, power is transmitted from the rear wheel 802 to the outer spindle or spider 202 to the electric motor 300 through the gearing 224, 236, therefore reducing the speed and kinetic energy of the bicycle 1000. The inner spindle 245 freewheels and is decoupled from the outer spindle or spider 202.

v. Operating pedaling, with regenerative braking. The electric motor 300 absorbs power from the outer spindle or spider 202 though the gearing 224, 236, as explained in the immediately preceding paragraph. If the rider is simultaneously applying sufficient torque by pedaling, the inner spindle 245 engages the freewheel mechanism 270 and is coupled with the outer spindle or spider 202, in which case the rider's legs provide regenerative energy to the batteries 500. Note that this mode of operation may not be possible where a clutch is provided on the motor 300 to prevent over-spinning the motor 300, or when the ratio of the gears 224, 236 is too high.

vi. Rider coasting, no e-assist or regenerative braking. The inner spindle 245 is decoupled from the outer spindle or spider 202 and freewheels. The electric motor 300 neither absorbs nor delivers power to the outer spindle or spider 202.

Any of the suitable technologies and materials set forth and incorporated herein may be used to implement various example aspects of the invention as would be apparent to one of skill in the art. Although exemplary embodiments and applications of the invention have been described herein including as described above and shown in the included example Figure(s), there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. A unitary system for an electric-assist bicycle configured to generate signals indicative of power input to a drive system of the bicycle by a rider when the rider pedals the bicycle and rotates a crankshaft, comprising:

a first assembly rotatable about a first axis and configured to receive rotational power from the rider when the rider pedals the bicycle and to transmit that rotational power to propel the bicycle, comprising a rotatable member configured to move laterally relative to a plurality of proximately-located non-rotating inductance coils, at least two of which are non-equally-spaced circumferentially around the first axis, in proportion to an amount of torque applied by the rider to the first rotating assembly, one or more of the inductance coils configured to generate a first electrical signal indicative of said amount of torque based on the lateral distance between the rotatable member and the inductance coils;

a magnetically permeable member rotatable with the rotatable member and positioned proximate the plurality of non-rotating inductance coils, the magnetically permeable member defining a shape symmetrical about a second axis that is non-concentric with the first axis, the magnetically permeable member configured to move eccentrically relative to the inductance coils when the rotatable member rotates and to change the inductance of at least two of the inductance coils as the magnetically permeable member rotates eccentrically relative to the inductance coils;

at least two of the inductance coils configured to generate a second electrical signal indicative of the rotational speed of the crankshaft corresponding to a frequency with which the magnetically permeable member rotates eccentrically relative to the inductance coils; and a circuit configured to combine the first and second electrical signals and generate a power input signal indicative of the power input to the drive system of the bicycle when the rider pedals the bicycle and rotates the crankshaft.

2. The unitary system of claim 1, at least two of the inductance coils configured to generate a third electrical signal indicative of the rotational direction of the crankshaft corresponding to an order in which a portion of the magnetically permeable member rotates past the inductance coils; and
    a circuit configured to combine the first, second, and third electrical signals and generate a directional power input signal indicative of the power input to the drive system of the bicycle when the rider pedals the bicycle and rotates the crankshaft in a first rotational direction.

3. The unitary system of claim 2, wherein the symmetrical shape defined by the magnetically permeable member about the second axis is circular.

4. The unitary system of claim 2, wherein the non-rotating inductance coils comprise two coils that are positioned at ninety degrees relative to one another circumferentially around the first axis.

5. An electric-assist bicycle comprising a unitary power measurement system configured to generate signals indicative of power input to a drive system of the bicycle when a rider pedals the bicycle and rotates a crankshaft in a first rotational direction, comprising:
    the unitary system of claim 2;
    a controller configured to process the directional power input signal and to generate a power output signal that is based at least partially on the directional power input signal and that is configured to control a level of power output by a motor configured to assist propulsion of the bicycle.

6. The electric-assist bicycle of claim 5, wherein the symmetrical shape defined by the magnetically permeable member about the second axis is circular.

7. The electric-assist bicycle of claim 5, wherein the non-rotating inductance coils comprise two coils that are positioned at ninety degrees relative to one another circumferentially around the first axis.

8. The electric-assist bicycle of claim 7, wherein the non-rotating inductance coils further comprise an annular coil positioned circumferentially around the first axis.

9. An electric-assist bicycle comprising a unitary power measurement system configured to generate signals indicative of power input to a drive system of the bicycle when a rider pedals the bicycle and rotates a crankshaft, comprising:
    the unitary system of claim 1;
    a controller configured to process the power input signal and to generate a power output signal that is based at least partially on the power input signal and that is configured to control a level of power output by a motor configured to assist propulsion of the bicycle.

10. The electric-assist bicycle of claim 9, wherein the symmetrical shape defined by the magnetically permeable member about the second axis is circular.

11. The electric-assist bicycle of claim 9, wherein the non-rotating inductance coils comprise two coils that are positioned at ninety degrees relative to one another circumferentially around the first axis.

\* \* \* \* \*